(12) United States Patent
Lange

(10) Patent No.: US 9,601,954 B2
(45) Date of Patent: Mar. 21, 2017

(54) ROTOR OF AN ELECTRIC MACHINE, AND ELECTRIC MACHINE

(71) Applicant: SIEMENS AKTIENGESELLSCHAFT, München (DE)

(72) Inventor: Thomas Lange, Fürth (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 147 days.

(21) Appl. No.: 14/424,781

(22) PCT Filed: Aug. 20, 2013

(86) PCT No.: PCT/EP2013/067323
§ 371 (c)(1),
(2) Date: Feb. 27, 2015

(87) PCT Pub. No.: WO2014/033016
PCT Pub. Date: Mar. 6, 2014

(65) Prior Publication Data
US 2015/0222153 A1 Aug. 6, 2015

(30) Foreign Application Priority Data
Aug. 28, 2012 (DE) .................. 10 2012 215 241

(51) Int. Cl.
H02K 5/24 (2006.01)
H02K 1/28 (2006.01)
(Continued)

(52) U.S. Cl.
CPC .............. *H02K 1/28* (2013.01); *B60L 3/0061* (2013.01); *H02K 1/276* (2013.01); *H02K 1/30* (2013.01);
(Continued)

(58) Field of Classification Search
CPC .................................. H02K 1/28; H02K 9/06
(Continued)

(56) References Cited

U.S. PATENT DOCUMENTS 3,826,940 A * 7/1974 McKean ............... H02K 17/165
310/211
5,512,792 A * 4/1996 Bawin .................. H02K 17/165
310/211
(Continued)

FOREIGN PATENT DOCUMENTS

CN 101171736 A 4/2008
DE 25 47 211 A1 4/1977
(Continued)

*Primary Examiner* — Hanh Nguyen
(74) *Attorney, Agent, or Firm* — Henry M. Feiereisen LLC

(57) ABSTRACT

A rotor of an electric machine includes a rotor lamination stack connected to a rotor shaft for conjoint rotation therewith. The rotor lamination stack extends from a first axial face of the rotor lamination stack to a second axial face when viewed in the direction of an axis of rotation of the rotor lamination stack. The rotor lamination stack has bores distributed around the axis of rotation and extending from the first axial face to the second axial face when viewed in the direction of the axis of rotation. A tie rod which protrudes from the axial faces when viewed in the direction of the axis of rotation is inserted into each bore. Fastening elements are attached to the tied rods at both axial faces so that the rotor laminations of the rotor lamination stack are pressed together. The tie rods are cast in the bores by a casting material.

15 Claims, 3 Drawing Sheets

(51) Int. Cl.
*H02K 1/27* (2006.01)
*H02K 1/30* (2006.01)
*H02K 1/32* (2006.01)
*H02K 9/06* (2006.01)
*H02K 7/04* (2006.01)
*B60L 3/00* (2006.01)

(52) U.S. Cl.
CPC ............... *H02K 1/32* (2013.01); *H02K 7/04* (2013.01); *H02K 9/06* (2013.01); *B60L 2240/36* (2013.01); *B60L 2270/145* (2013.01); *Y02T 10/641* (2013.01)

(58) Field of Classification Search
USPC ............... 310/51, 261.1, 216.004, 216.058
See application file for complete search history.

(56) References Cited

U.S. PATENT DOCUMENTS

| | | | |
|---|---|---|---|
| 6,441,532 B1 * | 8/2002 | Ahrens | H02K 1/26 310/211 |
| 6,741,010 B2 * | 5/2004 | Wilkin | H02K 1/27 310/156.02 |
| 6,949,858 B2 * | 9/2005 | White | H02K 1/06 310/216.004 |
| 2003/0011257 A1 * | 1/2003 | Akemakou | H02K 11/048 310/91 |
| 2004/0174086 A1 | 9/2004 | White | |
| 2008/0143198 A1 | 6/2008 | Bi | |
| 2011/0074242 A1 | 3/2011 | Singhal | |
| 2012/0098359 A1 | 4/2012 | Morozumi | |
| 2013/0293046 A1 | 11/2013 | Lange | |

FOREIGN PATENT DOCUMENTS

| | | |
|---|---|---|
| DE | 35 02 697 A1 | 6/1986 |
| DE | 698 25 386 T2 | 8/2005 |
| EP | 0 909 004 A2 | 4/1999 |
| EP | 2 416 472 A1 | 2/2012 |
| JP | 2009-072035 A | 4/2009 |
| JP | 2012050226 A | 3/2012 |
| WO | WO 02/054566 A1 | 7/2002 |

* cited by examiner

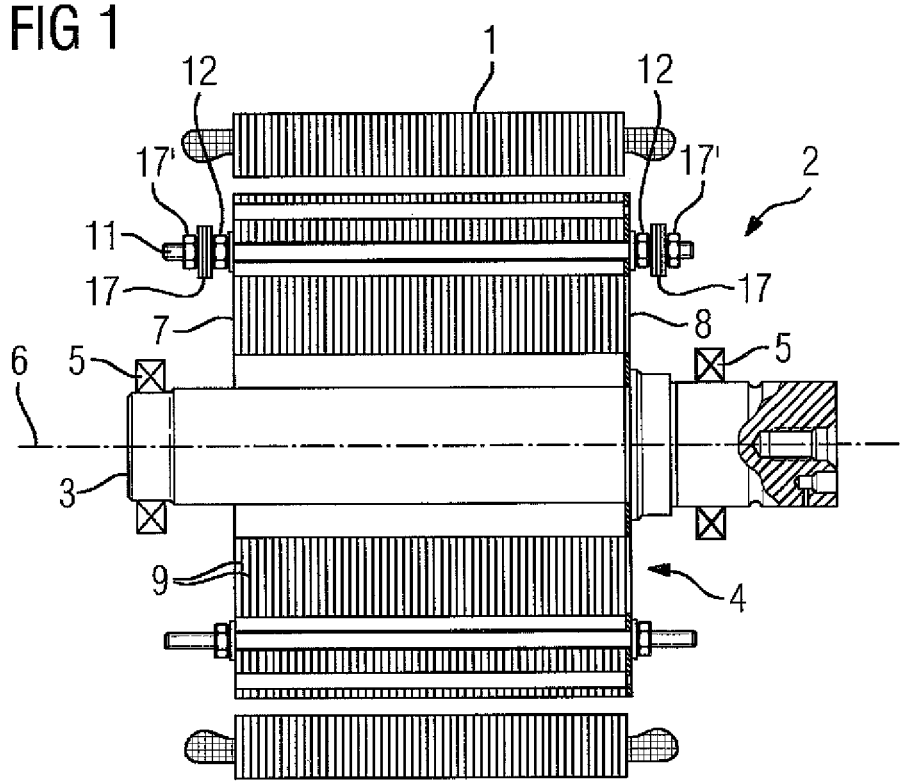
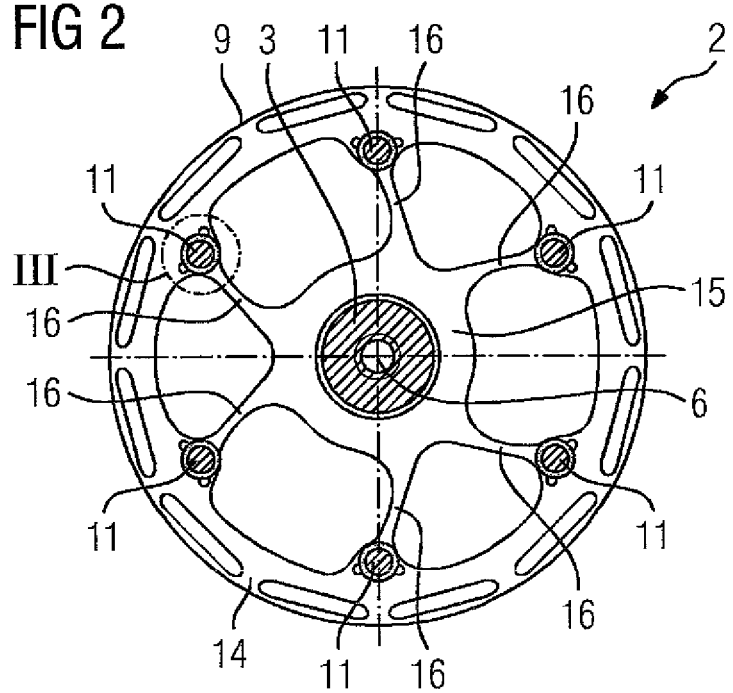

ROTOR OF AN ELECTRIC MACHINE, AND ELECTRIC MACHINE

CROSS-REFERENCES TO RELATED APPLICATIONS

This application is the U.S. National Stage of International Application No. PCT/EP2013/067323, filed Aug. 20, 2013, which designated the United States and has been published as International Publication No. WO 2014/033016 and which claims the priority of German Patent Application, Ser. No. 10 2012 215 241.5, filed Aug. 28, 2012, pursuant to 35 U.S.C. 119(a)-(d).

BACKGROUND OF THE INVENTION

The present invention relates to a rotor of an electrical machine,
wherein the rotor has a rotor laminated core connected to a rotor shaft of the rotor in a rotationally-fixed manner,
wherein the rotor laminated core extends from a first axial end face of the rotor laminated core to a second axial end face of the rotor laminated core when viewed in the direction of an axis of rotation of the rotor laminated core,
wherein the rotor laminated core has recesses that are distributed around the axis of rotation and extend from the first axial end face to the second axial end face when viewed in the direction of the axis of rotation.

The present invention furthermore relates to an electric machine
wherein the electric machine has a stator and a rotor,
wherein the rotor is mounted in bearings so that it can be rotated about an axis of rotation of the rotor.

Rotors of this type and electric machines of this type are generally known.

In the prior art the rotor laminated core is affixed to the rotor shaft. The so-called bundling pressure is applied via rotor pressure rings which are positioned on the two end faces of the rotor laminated core. The bundling pressure is transmitted via the rotor pressure rings to the rotor shaft. The bundling pressure causes a deflection of the rotor pressure rings. The rotor pressure rings must therefore be embodied so as to be accordingly stable in order to avoid an excessive deflection of the rotor pressure rings.

SUMMARY OF THE INVENTION

The object of the present invention consists in providing an electric machine which is simple in design and in particular does not require rotor pressure rings.

The object is achieved according to the invention by a rotor of an electric machine,
wherein the rotor has a rotor laminated core connected to a rotor shaft of the rotor in a rotationally-fixed manner,
wherein the rotor laminated core extends from a first axial end face of the rotor laminated core to a second axial end face of the rotor laminated core when viewed in the direction of an axis of rotation of the rotor laminated core,
wherein the rotor laminated core has recesses that are distributed around the axis of rotation and extend from the first axial end face to the second axial end face when viewed in the direction of the axis of rotation.
wherein tie rod, which projects beyond the axial end faces when viewed in the direction of the axis of rotation, is introduced into each of the recesses,
wherein fastening elements are positioned on the tie rods at both axial end faces so that the rotor sheets of the rotor laminated core are pressed against one another, and,
wherein the tie rods are potted in the recesses by means of a potting compound.

Advantageous embodiments of the rotor according to the invention are the subject matter of the dependent claims.

The rotor laminated core usually consists of a plurality of rotor sheets. In a preferred embodiment of the present invention the rotor sheets in each case have a yoke on their side facing away from the axis of rotation and in each case have a sheet hub on their side facing toward the axis of rotation. In this case the yokes and the sheet hubs of the rotor sheets are connected to one another via respective sheet spokes.

The presence of the tie rods means that it is possible for a fan to be positioned on the tie rods on the first axial end face of the rotor laminated core. In this case the fastening elements are preferably arranged on the first axial end face of the rotor laminated core between the end face and the fan.

The embodiment of the fan can be determined as required. Preferably the fan has an annular disk running orthogonally to the axis of rotation and fan blades protruding from the annular disk.

The annular disk can have an outer ring on its side facing away from the axis of rotation and a disk hub on its side facing toward the axis of rotation. In this case the fan blades are arranged on the outer ring and the outer ring and the disk hub are connected to one another via disk spokes. This embodiment is particularly expedient if the rotor sheets have the aforementioned sheet hubs and sheet spokes.

The fact that the disk hub is positioned on the tie rods means that it is possible for the disk hub to be connected to the rotor shaft in a manner which is not rotationally fixed. The disk hub in this case merely serves to help position and center the fan during assembly.

It is preferably provided that the fan blades are embodied as sheet parts and are mounted onto the annular disk. This produces a design of the fan which is particularly simple in terms of construction.

Preferably the fan blades are mounted onto the annular disk from the radial interior to the radial exterior. This produces a simplified mounting of the fan blades on the annular disk.

Preferably the fan blades are welded to the annular disk.

In a particularly preferred embodiment the fan blades have axially inner sections which are arranged between the annular disk and the first axial end face. In this case the axially inner sections in particular can rest against the first axial end face. This causes the rotor laminated core to be stabilized even further.

It is possible for at least one balancing weight to be positioned on at least one of the tie rods. In the case that the fan is positioned on the tie rods and the balancing weight is positioned on one of the tie rods on the first axial end face, the fan can in particular be arranged between the first axial end face and the balancing weight.

With regard to the electric machine, the object is achieved in that for an electric machine of the type cited in the introduction the rotor is embodied as explained above.

The electric machine can in principle be used for any purpose. Preferably it is used as a traction motor of a vehicle.

BRIEF DESCRIPTION OF THE DRAWING

The above-described characteristics, features and advantages of this invention, as well as the manner in which these are achieved, will become more clearly and easily intelligible in connection with the following description of the exemplary embodiments, which are explained in more detail in conjunction with the schematic drawings, in which:

FIG. 1 shows a longitudinal section of an electric machine,

FIG. 2 shows a cross-section of a rotor sheet,

DETAILED DESCRIPTION OF PREFERRED EMBODIMENTS

Figure 3:
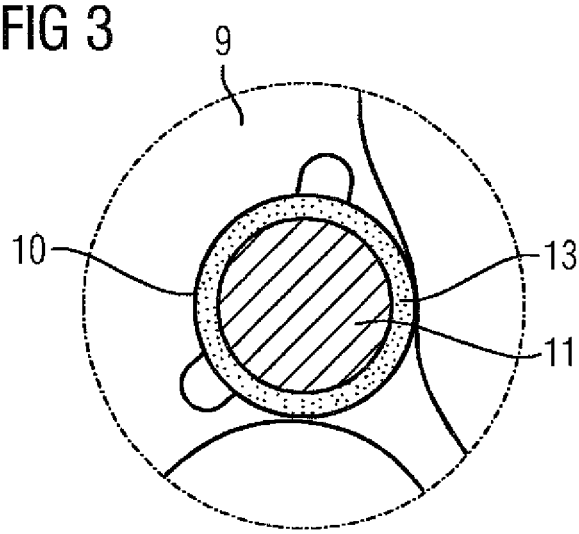
FIG. 3 shows a detail of FIG. 2.

In accordance with FIG. 1, an electric machine has a stator 1 and a rotor 2. The rotor 2 has a rotor shaft 3 and a rotor laminated core 4. The rotor shaft 3 is mounted in bearings 5 so that the rotor shaft 3 and with it the entire rotor 2 can be rotated about an axis of rotation 6 of the electric machine.

Insofar as reference is made hereinbelow to "axial", "radial" and "tangential", these always relate to the axis of rotation 6. The term "axial" means a direction parallel to the axis of rotation 6. The term "radial" means a direction orthogonal to the axis of rotation 6 toward the axis of rotation 6 or away from it. The term "tangential" means a direction orthogonal to the axis of rotation 6 and orthogonal to the radial direction, that is to say at a constant radial spacing from the axis of rotation 6 in a circular manner about the axis of rotation 6.

The rotor 2, in accordance with the illustration of FIG. 1, is generally arranged radially inside the stator 1. The electric machine is thus embodied as an internal rotor. However, the rotor 2 can alternatively be arranged radially outside the stator 2 in individual cases. In this case the electric machine is embodied as an external rotor.

The stator 1 of the electric machine is of minor importance within the context of the present invention. Therefore, only the rotor 2 is explained below in more detail.

According to FIG. 1, the rotor laminated core 4 extends from a first axial end face 7 of the rotor laminated core 4 to a second axial end face 8 of the rotor laminated core 4 when viewed in an axial direction. The rotor laminated core 4 consists of a plurality of rotor sheets 9, which are stacked on top of one another in an axial direction.

According to FIGS. 1 to 2, the rotor laminated core 4 has recesses 10. The recesses 10, according to FIG. 2, are arranged so as to be distributed around the axis of rotation 6. The recesses 10 extend in an axial direction end-to-end through the rotor laminated core 4, that is to say from the first axial end face 7 to the second axial end face 8. A tie rod 11 is introduced into each of the recesses 10. The tie rods 11 have a longer length than the rotor laminated core 4. The tie rods 11 thus project axially beyond the end faces 7, 8 of the rotor laminated core 4.

Positioned at both axial end faces 7, 8 of the tie rods 11 are fastening elements 12, for example nuts 12. By means of the fastening elements 12, the rotor sheets 9 of the rotor laminated core 4 are pressed against one another.

According to FIG. 3, the recesses 10 have a larger cross-section than the tie rods 11—even if only slightly. In order to avoid oscillation of the tie rods 11 during operation of the electric machine with certainty, the tie rods 11 are preferably potted in the recesses 10 by means of a potting compound 13. Suitable potting compounds are known per se to the person skilled in the art. They are for example used in the prior art for potting permanent magnets of a permanently excited electric machine.

FIG. 2 shows not only the underlying principle of the present invention, but simultaneously also a preferred embodiment of the rotor sheets 9. In particular according to FIG. 2 the rotor sheets 9 in each case have a yoke 14 on their side facing away from the axis of rotation 6 and in each case have a sheet hub 15 on their side facing toward the axis of rotation 6. The yokes 14 and the sheet hubs 15 of the rotor sheets 9 are connected to one another via respective sheet spokes 16. The use of the affix "sheet" when denoting the sheet hubs 15 and the sheet spokes 16 serves to verbally distinguish said elements from other hubs and spokes. No further meaning is assigned to the affix "sheet" in this context.

FIG. 1 likewise shows not only the underlying principle of the present invention, but simultaneously also a preferred embodiment of the electric machine. According to FIG. 1, to eliminate an imbalance (at least) one balancing weight 17 is positioned on at least one of the tie rods 11. Generally, according to the illustration of FIG. 1 two balancing weights 17 are positioned, wherein each one of the balancing weights 17 is positioned on the corresponding tie rod 11 on the first and the second axial end face 7, 8. The fastening of the balancing weights 17 to the corresponding tie rod 11 can take place as required. In particular the balancing weights 17 can be fastened by means of further fastening elements 17' (for example nuts 17').

Figure 4:
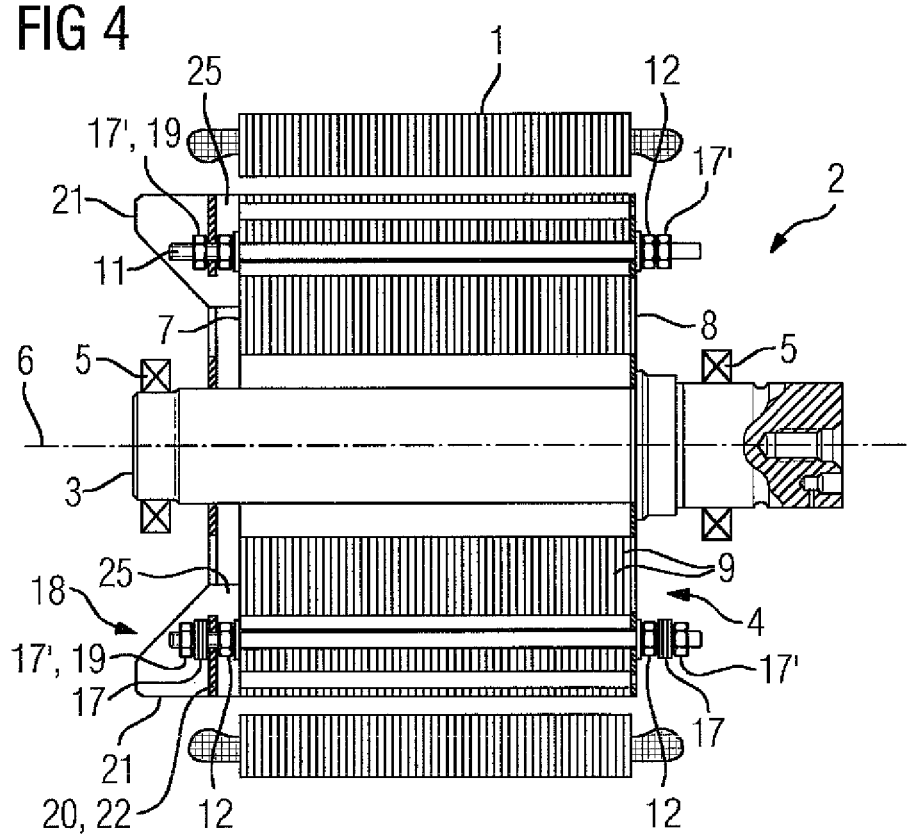
FIG. 4 shows a variant of the electric machine of FIG. 1.

FIG. 4 shows a further embodiment of the electric machine. According to FIG. 4 a fan 18 is positioned on the tie rods 11 on the first axial end face 7 of the rotor laminated core 4. According to the illustration of FIG. 4, the fan 18 can in particular be positioned on the fastening element 12 located on the first axial end face 7. In this case the fastening elements 12 are thus arranged between the first end face 7 and the fan 18. The fan 18 in particular can be fastened to the tie rods 11 by means of further fastening elements 19, for example once again by means of nuts 19.

Figure 5:
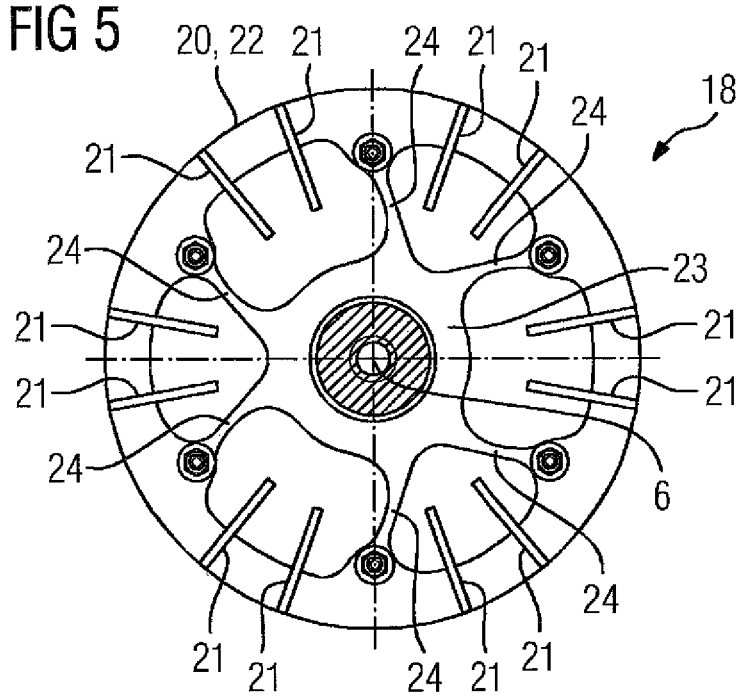
FIG. 5 shows a fan of the electric machine of FIG. 4 perpendicular to an axis of rotation and FIG. 6 shows a vehicle having an electric machine.

The fan 18 can be embodied as required. Preferably the fan according to FIGS. 4 and 5 has an annular disk 20 and fan blades 21. The annular disk 20 runs orthogonally to the axis of rotation 6. The fan blades 21 protrude from the annular disk 20. In particular, they can protrude from the annular disk 20 in an orthogonal manner.

It is possible that the annular disk 20 is identical to an outer ring 22. The outer ring 22 is essentially arranged with the same radial spacing as the yokes 14 of the rotor sheets 9. the fan blades 21 are arranged on the outer ring 22. According to FIG. 5, however, the annular disk 20 has a disk hub 23 in addition to the outer ring 22. The outer ring 22 is in this case arranged on the side of the annular disk 20 facing away from the axis of rotation 6, the disk hub 23 on the side of the annular disk 20 facing toward the axis of rotation 6. The outer ring 22 and the disk hub 23 are connected to one another via disk spokes 24. The use of the affix "disk" when denoting the disk hubs 23 and the disk spokes 24 serves to verbally distinguish said elements from other hubs and spokes. No further meaning is assigned to the affix "disk" in this context.

Should the annular disk 20 comprise the outer ring 22, the disk hub 23 and the disk spokes 24, the contour of the annular disk 20 preferably corresponds to that of a rotor sheet 9.

The disk hub 23 can be connected to the rotor shaft 3 in a rotationally-fixed manner. Preferably, however, the annular disk 20 is dimensioned such that the disk hub 23 is connected to the rotor shaft 3 in a manner which is not rotationally fixed. The disk hub 23 thus merely serves to help position and center the fan 18 during assembly.

In a particularly preferred embodiment the fan blades 21 are embodied as simple sheet parts. The annular disk 20 can also be embodied as a simple sheet part. The fan blades 21 can be mounted to the annular disk 20 for example. Preferably the fan blades 21 are mounted onto the annular disk 20 from the radial interior to the radial exterior.

The fan blades 21 can be connected to the annular disk 20 in any desired manner. Preferably the fan blades 21 are welded to the annular disk 20.

The fan blades 21, according to FIG. 4, have axially inner sections 25. The axially inner sections 25 of the fan blades 21 are, according to FIG. 4, arranged between the annular disk 20 and the first axial end face 7. Preferably the axial structural height of the axially inner section 25 is dimensioned such that the axially inner sections 25 rest against the first axial end face 7 under compressive stress. The spacing of the annular disk 20 or of the outer ring 22, as the case may be, from the first axial end face 7 thus has a slight waviness when viewed in the circumferential direction about the axis of rotation 6, wherein the minima lies in the region of the tie rods 11 and the maxima lies in the region of the fan blades 21.

As was the case for the embodiment shown in FIG. 1, balancing weights 17 are also present in the embodiment shown in FIG. 4. Generally here too, according to the illustration of FIG. 4, two balancing weights 17 are positioned, wherein each one of the balancing weights 17 is positioned on the corresponding tie rod 11 on the first and the second axial end face 7, 8. With regard to the balancing weight 17 positioned on the second axial end face 8, its arrangement and fastening is similar to that in FIG. 1 here. For the balancing weight 17 positioned on the corresponding tie rod 11 on the first axial end face 7, the fan 18 is preferably arranged between the first axial end face 7 and the balancing weight 17.

Figure 6:
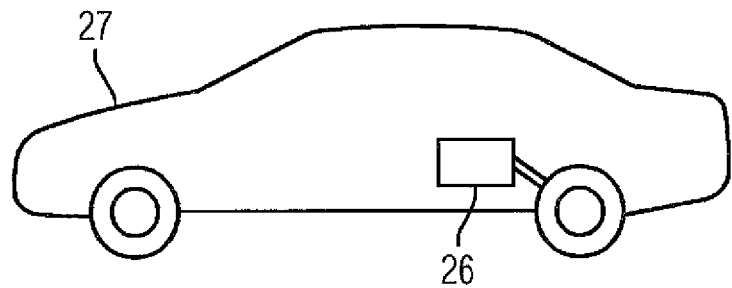

The electric machine according to the invention can in principle be used for any purpose. Preferably, the electric machine according to FIG. 6 is used as a traction motor 26 of a vehicle 27. The vehicle 27 can for example be embodied as a rail vehicle or as a road transport vehicle.

The present invention has many advantages. This allows, for example, the rotor pressure rings of the prior art to be dispensed with. This results in advantages regarding both cost and weight. The electric machine can also be constructed so as to be more compact than in the prior art. The spoke-based construction means that it is possible for the yoke 14 to be cooled in a highly efficient manner. There is also less material required for manufacturing the electric machine. In cases where the fan 18 is present, on the one hand the fan blades 21 additionally support the rotor laminated core 4 and on the other hand an additional oscillation damping of the fan blades 21 is effected. The connection of the fan 18 to the tie rods 11 means that the connection is only subjected to very low torsional stresses as a result.

Although the invention has been illustrated and described in greater detail with reference to the preferred exemplary embodiment, the invention is not limited by the examples disclosed and the person skilled in the art will be able to derive other variations on this basis without moving beyond the scope of protection of the invention.

What is claimed is:

1. A rotor of an electric machine, said rotor comprising:
   a rotor shaft;
   a rotor laminated core connected in fixed rotative engagement with the rotor shaft and having first and second axial end faces when viewed in a direction of an axis of rotation of the rotor laminated core, said rotor laminated core having recesses distributed around the axis of rotation and extending from the first axial end face to the second axial end face when viewed in the direction of the axis of rotation;
   tie rods sized to project beyond the first and second axial end faces when viewed in the direction of the axis of rotation and introduced into the recesses in one-to-one correspondence;
   a potting compound potting the tie rods in the recesses; and
   fastening elements positioned on the tie rods at the first and second axial end faces so that rotor sheets of the rotor laminated core are pressed against one another.

2. The rotor of claim 1, wherein each rotor sheet has a yoke on a side facing away from the axis of rotation and a sheet hub on a side facing toward the axis of rotation, the yoke and the sheet hub of each rotor sheet being connected to one another via sheet spokes of the rotor sheet.

3. The rotor of claim 1, further comprising a fan positioned upon the tie rods on the first axial end face of the rotor laminated core.

4. The rotor of claim 3, wherein the fastening elements are arranged on the first axial end face of the rotor laminated core between the first end face and the fan.

5. The rotor of claim 3, wherein the fan has an annular disk running orthogonally to the axis of rotation and fan blades protruding from the annular disk.

6. The rotor of claim 5, wherein the annular disk has an outer ring on a side facing away from the axis of rotation and a disk hub on a side facing toward the axis of rotation, with the fan blades being arranged on the outer ring, the outer ring and the disk hub being connected to one another via disk spokes.

7. The rotor of claim 6, wherein the disk hub is connected to the rotor shaft in the absence of a fixed rotative engagement.

8. The rotor of claim 5, wherein the fan blades are embodied as sheet parts and are mounted onto the annular disk.

9. The rotor of claim 5, wherein the fan blades are mounted onto the annular disk from a radial interior to a radial exterior.

10. The rotor of claim 5, wherein the fan blades are welded to the annular disk.

11. The rotor of claim 5, wherein the fan blades have axially inner sections which are arranged between the annular disk and the first axial end face and rest against the first axial end face under compressive stress.

12. The rotor of claim 3, further comprising at least one balancing weight positioned upon at least one of the tie rods on the first axial end face, said fan being arranged between the first axial end face and the balancing weight.

13. The rotor of claim 1, further comprising at least one balancing weight positioned upon at least one of the tie rods.

14. An electric machine, comprising:
    a stator;
    bearings; and
    a rotor interacting with the stator and being mounted in the bearings so as to be rotatable about an axis of rotation of the rotor, said rotor including a rotor shaft, a rotor laminated core connected in fixed rotative engagement with the rotor shaft and having first and second axial end faces when viewed in a direction of the axis of rotation of the rotor laminated core, said rotor laminated core having recesses distributed around the axis of rotation and extending from the first axial end face to the second axial end face when viewed in the direction of the axis of rotation, tie rods sized to project beyond the first and second axial end faces when viewed in the direction of the axis of rotation and introduced into the recesses in one-to-one correspondence, a potting compound potting the tie rods in the recesses, and fastening elements positioned on the tie rods at the first and second axial end faces so that rotor sheets of the rotor laminated core are pressed against one another.

15. The electric machine of claim 14, constructed in the form of a traction motor of a vehicle.

* * * * *